(12) United States Patent
Hayes et al.

(10) Patent No.: US 11,741,114 B2
(45) Date of Patent: Aug. 29, 2023

(54) DATA ANALYSIS PLATFORM

(71) Applicant: ExxonMobil Technology and Engineering Company, Annandale, NJ (US)

(72) Inventors: Michael A. Hayes, Southport, NC (US); Jeffrey Ludwig, Kintnesville, PA (US); Christopher S. Gurciullo, Bangor, PA (US); Terry J. Hayman, League City, TX (US); Krit H. Petty, Santa Clara, CA (US); Steven J. Seastream, Westfield, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 813 days.

(21) Appl. No.: 16/214,679

(22) Filed: Dec. 10, 2018

(65) Prior Publication Data

US 2019/0188192 A1    Jun. 20, 2019

Related U.S. Application Data

(60) Provisional application No. 62/607,450, filed on Dec. 19, 2017.

(51) Int. Cl.
*G06F 16/22* (2019.01)
*G06F 16/2458* (2019.01)
(Continued)

(52) U.S. Cl.
CPC ......... *G06F 16/2462* (2019.01); *G01D 9/005* (2013.01); *G05B 19/0421* (2013.01);
(Continued)

(58) Field of Classification Search
CPC ............ G06F 16/2228; G06F 16/2471; G06F 16/2477; G06F 16/278; G06F 16/2474;
(Continued)

(56) References Cited

U.S. PATENT DOCUMENTS

| | | | |
|---|---|---|---|
| 7,596,672 B1 * | 9/2009 | Gole | ................... G06F 11/2038 711/160 |
| 2011/0085671 A1 * | 4/2011 | Gibbs | ................... G10L 19/008 381/23 |

(Continued)

OTHER PUBLICATIONS

Li, et al., "Rolling Window Time Series Prediction Using MapReduce", School of Electrical and Information Engineering-The University of Sydney, 2014, pp. 757-764.

(Continued)

*Primary Examiner* — Allen S Lin
(74) *Attorney, Agent, or Firm* — Vorys, Sater, Seymour, and Pease LLP

(57) ABSTRACT

Systems and methods are provided for handling sequence-dependent data as part of processing and/or analyzing large data sets in a distributed data processing environment. The distributed data processing environment can be suitable for handling data generated at a plurality of sites within a network of manufacturing sites. The systems and methods can allow for pre-processing of some values for sequence-dependent data. This can allow secondary aggregated values and/or secondary aggregated data sets to be generated from sequence-dependent data that can span multiple blocks or partitions. Pre-calculation of secondary aggregated values and/or secondary aggregated data sets for sequence-dependent data can allow the efficiencies of parallel or distributed computation to be at least partially retained while also allowing for desired processing of the sequence-dependent data.

12 Claims, 2 Drawing Sheets

(51) Int. Cl.
  *G01D 9/00* (2006.01)
  *G06F 16/27* (2019.01)
  *G05B 19/042* (2006.01)
  *G05B 19/418* (2006.01)

(52) U.S. Cl.
  CPC ...... *G06F 16/2228* (2019.01); *G06F 16/2471* (2019.01); *G06F 16/2474* (2019.01); *G06F 16/2477* (2019.01); *G06F 16/278* (2019.01); *G05B 19/41885* (2013.01); *G05B 2219/13144* (2013.01)

(58) Field of Classification Search
  CPC ..... G06F 16/2462; G06F 16/27; G01D 9/005; G01D 9/007; G05B 19/0421; G05B 19/41885; G05B 2219/13144
  See application file for complete search history.

(56) References Cited

U.S. PATENT DOCUMENTS

| | | |
|---|---|---|
| 2012/0041574 A1 | 2/2012 | Hsiung et al. |
| 2014/0082098 A1* | 3/2014 | Collins .............. G06Q 10/109 709/224 |
| 2017/0006135 A1* | 1/2017 | Siebel .................... H04L 67/20 |
| 2017/0308802 A1 | 10/2017 | Ramsey et al. |

OTHER PUBLICATIONS

The International Search Report and Written Opinion of PCT/US2018/064700 dated Mar. 14, 2019.

* cited by examiner

DATA ANALYSIS PLATFORM

CROSS-REFERENCE TO RELATED APPLICATIONS

This application claims priority to U.S. Provisional Application Ser. No. 62/607,450 filed Dec. 19, 2017, which is herein incorporated by reference in its entirety.

FIELD

Systems and methods are described for providing a data analysis platform suitable for aggregation and analysis of data from a manufacturing network. The data analysis platform can include systems and methods for analysis of sequence-dependent data in a distributed computing environment.

BACKGROUND

Operation of modern facilities for petroleum extraction, petroleum processing, and/or chemical production typically involves controlling a variety of inter-related manufacturing/production processes. To improve the efficiency of various processes in a facility, the manufacturing/production processes are typically controlled at various levels. At the individual process level, sensors can be used to monitor individual controlled variables while process controllers can be operated to change manipulated variables in response to sensor values in order to maintain an individual process in a desired operating range. An overall model can then be used to coordinate operation of the process controllers, including providing updated set points for the controllers. Still higher level models can be used to coordinate the various individual processes, so that processes can be optimized at least in part to increase the overall value for a group of processes and/or an entire production facility.

The various sensors, process controllers, and modeling layers can result in generation of vast quantities of data for just a single manufacturing facility. For a typical manufacturing site, a site process historian can be used to store and analyze at least portions of the data. It would be desirable, however, to be able to perform additional data analysis based on data aggregated across multiple facilities in a manufacturing network, so that knowledge gained in one location can be implemented throughout the network. However, attempting to aggregate data across facilities for unified analysis can present a variety of problems. Some problems can be related to differences between sites, such as differences in security protocols, data sampling, and/or data formatting. Other difficulties can be related to the sheer volume of data that is available. Still other difficulties can be related to accounting for differences in the processing equipment and/or configuration between various sites for performing similar processes.

SUMMARY

In an aspect, a method for managing sequence-dependent data sets in a distributed computing environment is provided. The method can include obtaining process characterization data from a plurality of manufacturing site data sources comprising sequence-dependent data, such as time-sequence data. The plurality of manufacturing site data sources can be located, for example, at a plurality of production sites. The obtained process characterization data can be stored in data partitions. One or more secondary aggregated data values can be calculated based on sequence-dependent data from a plurality of data partitions. The plurality of data partitions can include a first data partition and a second data partition. A data analysis request can then be received based on the obtained process characterization data. The received request can be processed in a distributed computing environment to generate an analyzed result. The processing can correspond to processing data from the first data partition of the plurality of data partitions on a different node than data from the second data partition. The analyzed result can include at least one secondary aggregated data value, at least one value based on a secondary aggregated data value, or a combination thereof.

Examples of manufacturing site data sources can include sensors and process controllers. Examples of production sites can include refineries, chemical production sites, and extraction sites.

In some aspects, the calculated one or more secondary aggregated data values are stored in the plurality of data partitions. Additionally or alternatively, the calculated one or more secondary aggregated data values are stored in a separate database from the plurality of data partitions. Additionally or alternatively, each of the calculated one or more secondary aggregated data values can be stored in each of the plurality of data partitions.

In various aspects, the calculated one or more secondary aggregated data values can correspond to time offset correlation values; moving average values; interpolated data values; extrapolated data values; imputed data values; smoothed data values; or a combination thereof.

Optionally, the received data processing request can correspond to further data processing of at least one secondary aggregated data value to generate a tertiary aggregated data value, the analyzed result comprising the tertiary aggregated data value.

In another aspect, a system for managing sequence-dependent data sets in a distributed computing environment is provided. The system can include a manufacturing data lake comprising data partitions for storing received data from a plurality of manufacturing sites, the received data comprising sequence-dependent data. The system can further include a pre-calculation component for pre-calculating secondary aggregated data values based on stored sequence-dependent data from a plurality of partitions of the manufacturing data lake. The system can further include a database for storing the pre-calculated secondary aggregated data values. The system can further include one or more applications for processing the pre-calculated secondary aggregated data values to generate tertiary aggregated data values.

DETAILED DESCRIPTION

Overview

Figure 1:
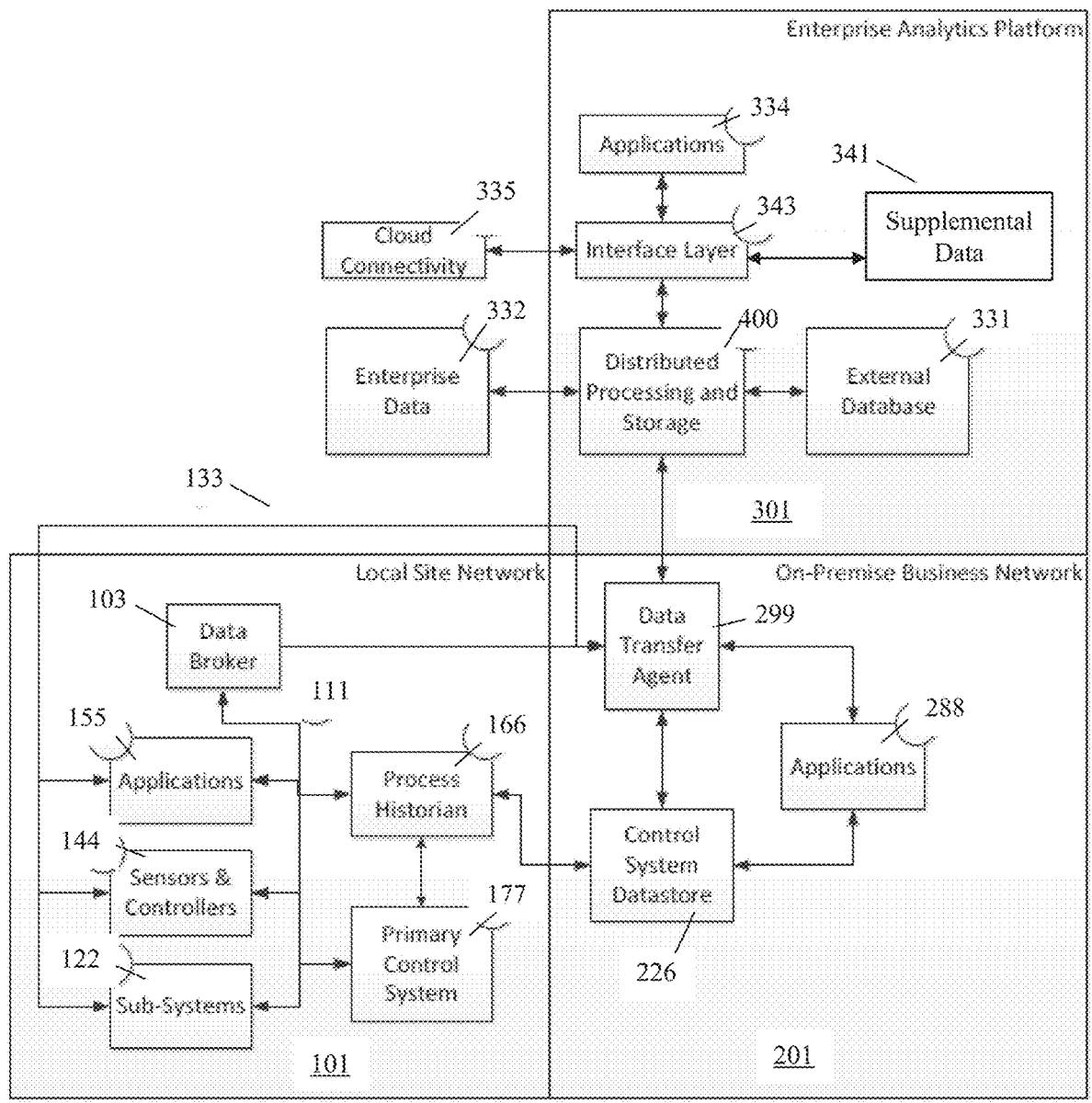
FIG. 1 schematically shows an example of a platform architecture for aggregating data from a manufacturing network for centralized storage and data analysis.

In various aspects, systems and methods are provided for handling sequence-dependent data as part of processing and/or analyzing large data sets in a distributed data processing environment. The distributed data processing environment can be suitable for handling data generated at a plurality of sites within a network of manufacturing sites. Such manufacturing sites can include, but are not limited to, chemical production plants, refineries, offshore and onshore production/extraction sites, and temporary facilities corresponding to extraction sites, such as drilling rigs. The systems and methods can allow for pre-processing of some values for sequence-dependent data. This can allow secondary aggregated values and/or secondary aggregated data sets to be generated from sequence-dependent data that can span multiple blocks or partitions. Such secondary aggregated values and/or secondary aggregated data sets based on sequence-dependent data can be difficult to generate in a distributed processing environment, since data partitions are often distributed to multiple processors to allow for parallel processing. Pre-calculation of secondary aggregated values and/or secondary aggregated data sets for sequence-dependent data can allow the efficiencies of parallel or distributed computation to be at least partially retained while also allowing for desired processing of the sequence-dependent data.

The ability to aggregate processing data generated at low levels across multiple manufacturing sites, such as at the level of individual sensors or process controllers, can potentially allow for analysis of the aggregated data to identify process level improvements, manufacturing site level improvements, and/or network-wide improvements. Some opportunities can be related to increasing the efficiency of global fleet/network asset and operations monitoring via centralization. Other opportunities can be related to using remote monitoring and interactive collaboration to leverage manufacturing site and/or network expertise in identifying and addressing emerging operational and reliability issues. Such aggregation can potentially allow, for example, application of new data analytics and machine learning in combination with fundamental modeling to enable data-driven decision processes and optimization of manufacturing operations, reliability, and maintenance. In some aspects, one or more of the above features can be implemented, in part, based on providing centralized data storage for manufacturing network data at the individual sensor and/or process controller level. Such a centralized data storage environment for a plurality of manufacturing sites can be referred to as a manufacturing data lake (MDL).

Conventionally, data for a manufacturing network (such as a petroleum/chemical production, refining, and/or hydrocarbon extraction network) can be distributed across many geographically and technologically diverse data sources and data bases. Each data source and data base system can maintain (different) rules for data access that inhibit the gathering and analysis of data from the plurality of sources and/or plurality of sites in a practical manner. MDL storage can allow a single user to have access to this manufacturing network data in the form of a centralized repository with role specific data access rules. The MDL storage and processing can allow for efficient scaling of analytic solutions across different assets and sites. Additionally or alternately, the MDL storage and/or processing can include an asset modeling framework. This can allow, for example, site-specific configuration and/or tags to be mapped to a general configuration (for example, a generalized fluid catalytic cracking configuration or a generalized pipestill configuration) to allow for aggregation of data across similar but not identical processes. This mapping can be based in part on data analytics and physics-based models. Further additionally or alternately, the MDL can enable application of algorithms to improve the consistency and quality of data from a given site by, for example, screening the data for outliers, identifying patterns within the data, and/or reconciling raw data to known mathematical rules (e.g. material balances). Additionally or alternately, the MDL can enable application of algorithms and numerical methods requiring significant computer processing capability to the aggregated data, such as algorithms and methods that conventionally requiring processing in a distributed computing environment to be performed in a commercially viable manner.

In various aspects, aggregating data into a manufacturing data lake (MDL) can allow for various improvements in data analysis. For example, the MDL can allow for calculation and utilization of time offsets between elements of data in the MDL. An example of a time offset is an expected lag time correlation between data sets. The lag time can refer to the time difference between a perturbation in the feed and/or operating conditions of an upstream asset and a corresponding observed perturbation in a downstream asset due to intervening process holdups and/or tankage. An expected lag time between various upstream and downstream assets can be estimated based on knowledge of the manufacturing site and asset configurations. These offsets could be calculated, for example, through first principle analysis or inferred through data analytics techniques operating over the process data set. The availability of time offset information can be beneficial to the analysis of time series data across a complicated manufacturing site.

Another example of a potential improvement in data analysis can be with regard to interpolation, extrapolation, and/or imputation of missing values in a data set. Optionally, such interpolation, extrapolation and/or imputation of values can include an estimate of the confidence in the additional data values. For example, three consecutive time windows within a data set could include 100 data values, 5 data values, and 100 data values, respectively. It can be either known or inferred that data values are missing from the middle time window. In this type of situation, the data windows with the large number of data values can be used, for example, to estimate the process variability. The process variability can then be used to assign uncertainty bands to extrapolated data values for the middle time window. This ability to interpolate, extrapolate, and/or impute data values in a data set can allow incomplete data sets to still be used as part of the data lake while reducing or minimizing artifacts in the data due to missing values.

Still another example of a potential data analysis improvement can be related to "squaring up" data. Many types of process data are gathered in an asynchronous manner. This can complicate making comparisons between data sets collected at different locations. In order to facilitate comparison, data points from an asynchronous data set can be mapped to a uniformly spaced grid in order to standardize the data set. In addition to making it easier to correlate data points between data sets for analysis, mapping the values to a grid can also make it easier to identify whether any data points are "missing" relative to the grid. Such missing data points can then be added to the data set using interpolation, extrapolation, and/or imputation.

Another type of benefit from an MDL can be related to the ability to leverage advanced process control applications and planning/optimization applications as additional data sources for analytics applications. An example is using heat transfer coefficient history calculated by Real-Time Optimization (RTO) applications (along with other crude and operations data in the MDL) to understand the relationship between feed quality, operations, and fouling rate. Machine learning techniques may be able to identify patterns in the MDL data that cannot be comprehended by examining narrower, less comprehensive data sets.

In this discussion, sequence-dependent data is defined as data where the individual values in a data set include a dependence on at least one other value within the data set. One example of sequence-dependent data is time-series data. Time-series data can be used to calculate time-dependent values, such as a moving average. A moving average can typically involve calculating an average within a window of time. When a moving average is calculated in a distributed computing environment with data partitions organized based on time, a processor having a partition of data will not be able to properly calculate the moving average values at the beginning and/or end of the data window, as at least a portion of the data points necessary for the moving average calculation will be part of a different data partition on a different processor. For non-sequence dependent data, calculation of values based on data in two different partitions can be performed by simply aggregating values after completing computations on individual processors.

In this discussion, secondary aggregated data values and/or secondary aggregated data sets correspond to data values or data sets that are pre-calculated by the system. The secondary aggregated data values and/or secondary aggregated data sets that are based on sequence-dependent data can potentially take additional time to calculate due to the dependence of the data values/data sets on multiple data partitions. This can disrupt the ability of a process scheduler in a distributed computing environment from efficiently performing a data processing task. Pre-calculation can allow the secondary aggregated data values and/or data sets to be generated in advance, so that the excess processing time for generating such values/data sets has a reduced or minimized impact on response time for subsequent user data analysis requests. A user can use the secondary aggregated data values or data sets directly, or the secondary aggregated data values/data sets can be undergo further processing based on a user data analysis request to generate tertiary aggregated data values and/or tertiary aggregated data sets. However, based on the pre-calculation, the secondary aggregated data values/data sets no longer have dependence on data from multiple partitions, so the tertiary aggregated data values and/or tertiary aggregated data sets can be generated using conventional processing in a distributed computing environment.

In this discussion, a site historian or process historian refers to data storage (and corresponding management for the data storage) that is associated with one or more processes at a manufacturing site and/or that is associated generally with processes at a manufacturing site. The site historian or process historian can maintain a database of historical process values to allow for further analysis.

Technical Effect

The systems and methods described herein can provide a variety of technical benefits. In some aspects, the systems and methods can provide a step-change improvement in a user's ability to access data (including contextual information) from data storage related to a manufacturing network for potentially disparate types of data, including both sequence-dependent data (e.g., time series) and non-sequence-dependent data. This can reduce or minimize the user expertise and/or access rights that are needed to perform data analysis across a manufacturing network. For example, the systems and methods can allow a user to analyze process data from a manufacturing network without requiring a user to access individual manufacturing sites. Any inconsistencies between sites can also be cured without requiring user knowledge of site differences. The ability to provide user access to data across a manufacturing network can also facilitate user collaboration between manufacturing sites.

Additionally or alternately, the systems and methods described herein can also provide an easy-to-use, modular development platform for improved adoption and deployment of advanced analytics/machine learning methods in all aspects of operations and maintenance analysis. This can include reducing the amount of user intervention required for management of processes, such as by expanding the amount of centralized monitoring that can be performed. The centralized monitoring can potentially be used to cover process and equipment assets at a plurality of manufacturing facilities within a network. This centralized monitoring can also be beneficial for allowing integration of analytics methods and applications into automated work processes.

Data Partitions and Sequence-Dependent Data

One source of difficulty in attempting to aggregate data across a plurality of manufacturing sites within a manufacturing network can be the large volume of data. Each manufacturing site alone can generate an amount of data that is difficult to process, and aggregating data from multiple sites only compounds the amount of data for potential analysis.

To further illustrate the nature of the problem, a refinery is a type of manufacturing site for processing of crude oils, crude fractions, and/or other petroleum-based feed streams. Within a refinery, many processes can be controlled based on using a process controller to change the value of a manipulated variable in response to a measured value of a controlled variable. An example of a controlled variable can be a temperature at a location in a process element, such as a temperature in a reactor, a pipe, or a distillation column. An example of a manipulated variable can be an electrical actuator for controlling the duty cycle on a heater, or a valve for modifying the flow rate of a fluid into/out of the process element. Based on a measured value of a controlled variable, a process controller can adjust the manipulated variable (i.e., adjust the duty cycle or adjust the valve position) in an effort to maintain the controlled variable at or near a desired set point. These adjustments are made based on algorithms within the process controller. Such process controller algorithms, such as algorithms for a proportional-integral-derivative controller, can include various adjustable parameters that can modify how the process controller responds to changes in the controlled variable. While the above description relates to a refinery process, similar controlled variable/manipulated variable/process controller relationships are present in various types of manufacturing sites, such as chemical production plants and/or hydrocarbon production (extraction) sites.

The above example describes the relationship between a controlled variable, a manipulated variable, and corresponding sensor(s) and process controller(s). In such an example, values that might be sampled/captured multiple times per minute (or even multiple times per second) by a process historian (and/or any other convenient data collection system) to provide potentially useful data include, but are not limited to, values of the controlled variable; values of the manipulated variable; the set point for the controller; and the parameters for the controller. A typical refinery can include thousands or tens of thousands (or possibly more) of process controllers that are used to manage individual manipulated variables related to controlled variables for various processes. Thus, a single manufacturing site can generate a large amount of data. It is noted that in addition to these measurements at the lowest levels, additional values generated at a refinery site can be related to desired set points for the controlled variables. The set points can be determined by various modelling layers that can be used to optimize performance of a process and/or optimize performance across multiple processes within a refinery.

For large data volumes such as the amount of data generated at a typical manufacturing site, systems and methods for data processing and data analysis typically involve some type of processing in a distributed environment, where a large plurality of processors can be used to process the data. In order to take advantage of this parallel processing, the data is typically divided into data blocks or partitions. An example of a data partition could correspond to all of the data associated with the controlled variable and manipulated variable associated with a single process (or possibly a single process controller) for a fixed time period, such as a time period of one day. The partition size can vary, with the understanding the dividing data into smaller partitions can typically result in higher parallel computing efficiency, but with an associated increasing overhead cost as the number of partitions increases.

In a conventional data management environment, dividing data into partitions does not create special data processing issues. In particular, for typical data sets, the data within a partition can be independent of the data sequence. This means that any values of interest to the end user do not depend on a particular ordering of the data. When a user specifies a request for data analysis, the data in each partition that is relevant can be separately processed. To the degree a data analysis request involves data from multiple partitions, the data from each individual partition can be first processed separately, and then subsequently combined in a straightforward manner to generate the requested secondary values. Examples of subsequent combination to form secondary values can include, but are not limited to, addition of values, determining a weighted average based on the relative number of data points represented by the data from each partition, or other typical methods.

In contrast to conventional methods for handling large data sets, the data sets generated at a manufacturing site are often sequence-dependent, such as time-dependent. For sequence-dependent data (such as time-dependent data), dividing data into partitions can pose difficulties when performing data analysis. For example, when calculating a moving average as a secondary aggregated data set, the end points of the data stored in each partition will not be sufficient to calculate at least a portion of the moving average values, as at least portions of the moving average will depend on data values located in a plurality of partitions. As another example, determining time offsets between events can be difficult during a computation in a distributed computing environment. Typically the data from different process elements in a manufacturing site will be divided into different partitions. As a result, no single processor in a distributed computing environment will have sufficient information to determine time offset values.

The above data processing situations can cause a substantial increase in the amount of time required to respond to a user query regarding a large data set. In various aspects, instead of handling sequence-dependent data in this conventional manner, the sequence-dependent nature of the data can be removed by pre-calculating secondary aggregated data values based on the sequence-dependent data. Instead of waiting for a user to provide a request for a specific type of analysis of sequence-dependent data, one or more secondary aggregated values based on the sequence-dependent data can be pre-calculated and stored. A user can then request the pre-calculated secondary aggregated data values/data sets directly for review, or the secondary aggregated values can be further manipulated based on a user request to provide a target or desired tertiary aggregated data values data sets.

Example of Data Analysis Platform Architecture

FIG. 1 shows an example of systems that can be used for aggregation of data from a plurality of manufacturing sites into an enterprise analytics platform having an associated centralized storage, to allow for data analysis across a plurality of manufacturing sites. In FIG. 1, a single local site network 101 is represented to facilitate explanation. It is understood that a plurality of local site networks can be present. Similarly, a plurality of on-premises business networks 201 can be present to facilitate communication between local site networks 101 and enterprise analytics platform 301.

Local site network 101 can correspond to a network associated with a single manufacturing site, a network associated with a portion of a manufacturing site, a network associated with a plurality of closely integrated manufacturing sites, or any other convenient network that serves a collection of processes that are managed as a manufacturing unit.

In the example shown in FIG. 1, local site network 101 includes a process control network 111. The process control network 111 can facilitate communication between various data generation and processing features within the local site network 101. For example, process control network 111 can facilitate communication between primary control system 177 and various sensors and controllers 144. The primary control system 177 can correspond to the system (or systems) that are used to monitor and control process elements within the manufacturing site. Such monitoring and control can be performed in part using sensors and controllers 144. The primary control system can control settings and/or receive data related to sensor values, control parameters for process controllers (such as control loop tunings), alert and alarm configuration and status, ad-hoc operations logs, inferential models, and/or procedural control strategies. The primary control system 177 can further communicate with any additional sub-systems 122 that are present in the local site network 111. The subsystems 122 can correspond to, for example, analyzers, programmable logic controllers, tank gauges, safety systems, and supervisory control and data acquisition systems (SCADA) which are not the primary control system. In addition to the primary control system 177, sensors and controllers 144, and sub-systems 122, the local site network 111 can further include various applications 155. Applications 155 can include real time optimization, multi-variate dynamic control, blend recipe optimization tools, control loop performance monitoring, well control, drilling optimization, anomaly detection, predictive analytics for reliability, and operator guidance. The primary control system 177, sensors and controllers 144, sub-systems 122, and applications 155 can also be in communication with a site process historian 166 that can record data values obtained by sensors, controller parameter settings, and/or any other measured or set value within local site network 101 that may be of interest for further data analysis.

For aggregation of data at a central location, various options are available that can be used individually or in conjunction with each other. One option can be for a data broker 103 to acquire data from site process historian 166, for communication with a data transfer agent 299 of on-premises business network 201. Data transfer agent 299 can provide various data transfer features, such as encryption, data governance, buffering, recovery from network errors, authentication, logging and/or throttling. Data transfer agent 299 can handle multiple data formats, such as process control protocols, general computer files, and data formats used in relational databases. Additionally or alternatively, data broker 103 can receive values from one or more of primary control system 177, sensors and controllers 144, sub-systems 122, and/or applications 155 for transmittal to data transfer agent 299. Further additionally or alternatively, a separate analytics network 133 can be used to directly transfer data from sensors and controllers 144, sub-systems 122, and/or applications 155 to data transfer agent 299. Optionally, a portion of the sensors and controllers 144 can correspond to sensors and controllers that are partially or entirely associated with the analytics network 133, rather being controlled and/or monitored by primary control system 177. Optionally, the analytics network 133 can by-pass the primary control system 177 and directly receive data from sensors and controllers 144, sub-systems 122, and/or applications 155. Optionally, analytics network 133 can correspond to a wireless network.

In addition to receiving data from data broker 103 and/or analytics network 133, the on-premises business network 201 can also receive data by having process historian 166 transfer data to control system datastore 226. The control system datastore 226 can correspond to an alternative and/or longer term type of storage for data collected by the process historian.

The data received by data transfer agent 299 and control system datastore 226 can be further processed by business network applications 288. Business network applications 288 can include, for example, optimization tools (planning and scheduling), process and equipment health monitoring, reservoir and wellbore monitoring and optimization, alert and alarm management, oil movements, inventory monitoring, engineering models of processes and equipment, drawings, inspection and maintenance data, lab data systems, quality assurance systems, instrumentation databases, and asset modeling tools.

The data transfer agent 299 of an on-premises business network 201 can facilitate communication between a local site network 101 and the enterprise analytics platform 301. In the example shown in FIG. 1, data transfer agent 299 can transfer data to/from distributed processing and storage 400. Distributed processing and storage 400 can include, for example, a manufacturing data lake. Generally, distributed processing and storage environment can provide redundant data storage, job scheduling, security, and a development environment for custom application development. Storage can be in files, or in relational or non-relational distributed data storage. In the relational data store, data can be separated into partitions which can be processed in parallel. Mathematical operations which depend on multiple partitions (such as moving averages) can be pre-calculated and stored to improve performance. The platform can be hosted on premise at a central location, or can be hosted in the cloud, with or without regional replication for performance.

The distributed processing and storage 400 can also communicate with one or more external databases 331. External database(s) 331 can correspond to one or more non-distributed databases which can be used to store the results of analytics applications running on distributed processing and storage 400. For example, external database(s) 331 can be used to store secondary aggregated data values/data sets that are generated by pre-calculations performed on sequence-dependent data by distributed processing and storage 400. External database(s) 331 can also store meta-data associated with data stored on data processing and storage 400. Optionally, external database(s) 331 can also serve applications.

Distributed processing and storage can also communicate with an interface layer 343. Interface layer 343 can provide a bridge to applications 334 through various protocols, which can include OPC-DA, OPC-DHA, OPC-UA, MQTT, JDBC, ODBC, Web Services, and low level API access. The interface layer can also normalize data resources from various sites to reduce application configuration and deployment. Applications 334 can include, but are not limited to, production optimization, planning and scheduling tools, inventory management, engineering model tuning and fitting, process and equipment health monitoring, alerting and alarming, anomalous event detection, inspection optimization, data reconciliation, asset modeling, rules based guidance, reservoir and wellbore monitoring and optimization, machine learning applications, text analytics, engineering tool integration including Excel, product blend monitoring, and business analytics.

Optionally, interface layer 343 can be used for communication via a wide area network, such as a cloud computing network 335, with other data sources. This can allow the enterprise analytics platform to publish and ingest data to and from other analytics environments, both internal and external. Additionally or alternatively, the interface layer can allow for access to a variety of supplemental data 341. Such supplemental data 341 can include, but is not limited to, weather, pricing of various feeds and/or products, third party data, and customer/terminal data. Optionally, the supplemental data 341 can be accessed via cloud computing network 335.

Distributed processing and storage 400 can also communicate with enterprise data system 332. Enterprise data can include data from enterprise resource planning systems, financial and pricing information, engineering models, drawings, inspection and maintenance systems, planning and scheduling tools, reference data (e.g. units of measure, asset models for sites), technical databases (e.g. crude assays), and free and commercially available external data. Enterprise data 332 can be used by distributed processing and storage 400, for example, for performing optimization analysis on a manufacturing network-wide basis.

The platform shown in FIG. 1 can also be understood with regard to the various layers of services provided in the platform. For example, the lowest layer of services at a manufacturing site can correspond to a physical devices and connectivity layer. This can include process instrumentation and equipment, such as the reactors, tanks, and piping used to perform the various processes within a manufacturing site. This can also include sensors and controllers 144 for directly monitoring and managing the processes, applications 155, and other sub-systems 122. Additionally, the physical devices and connectivity layer can include process control structures such as primary control system 177.

A next layer can correspond to a site data accumulation layer. This is represented in FIG. 1 by process historian 166.

More generally, multiple process historians and/or a site historian can be included in the site data accumulation layer, along with optionally one or more supplemental or mirror storage systems.

A next layer can correspond to a site data integration layer.

A next layer can correspond to a site applications layer, which can correspond to applications 288 in FIG. 1. The site applications layer can provide applications for optimization of individual processes; applications for optimization across processes within the manufacturing site; instrumentation for additional off-line measurements used to characterize process and/or site performance; and/or other applications or systems for management of process or site operations. Optionally, the site applications layer can provide functionality for site collaboration and data visualization, or the collaboration and data visualization can be provided as a separate layer.

The next layer can correspond to a data assimilation layer. Portions of the data assimilation layer can potentially be located in both on-premises business network 201 and enterprise analytics platform 301 in FIG. 1. For example, the data assimilation layer can include data transfer agent 299. The data assimilation layer can also include distributed processing and storage 400.

The distributed processing and storage 400 can also partially reside within the next layer, which can correspond to a data integration layer. Optionally, enterprise data system 332 and/or external database 331 for storing the secondary aggregated data values/data sets can also be within the data assimilation layer and/or the data integration layer.

The data integration layer can also include interface layer 343, which can allow for communication with an application layer that contains applications 334. The interface layer can also allow for communication with a final collaboration and visualization layer, which can include additional applications from applications 334 as well as connectivity to cloud-based analytics via cloud computing 335.

In some aspects, the functions performed by components of platform 100 in FIG. 1 can be associated with one or more applications, services, or routines. In particular, such applications, services, or routines may operate on one or more user devices and/or servers, may be distributed across one or more user devices and servers, or be implemented in the cloud. Moreover, in some aspects, these components of platform 100 may be distributed across a network. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example platform 100, it is contemplated that in some aspects functionality of these components can be shared or distributed across other components.

Data Platform—Manufacturing Data Lake

In various aspects, the ability to generate secondary aggregated data values/data sets based on sequence-dependent data can be facilitated by use of a manufacturing data lake (MDL) in conjunction with an enterprise analytics platform. Additionally or alternately, the ability for users to access and manipulate such secondary aggregated data values/data sets to generate tertiary aggregated data values based on sequence-dependent data as part of analysis of data for a manufacturing network can be facilitated by use of a manufacturing data lake (MDL) in conjunction with an enterprise analytics platform. The MDL can act as a central repository for data from across the manufacturing network. The enterprise analytics platform can analyze and process data from the MDL, which can provide and/or enable a variety of capabilities. The combination of the MDL and the enterprise analytics platform can provide a step-change improvement in data access and contextual information to all relevant site process and equipment data including, but not limited to, design, process, inspection, maintenance, and work orders by migrating the data to a centralized data store. Additionally or alternately, the MDL and platform can provide capabilities to migrate and organize the data currently stored in disparate site systems into a scalable centralized data store with the appropriate contextual information to facilitate query and analysis.

Some benefits can be related to formation and use of the MDL as a centralized data store. Data aggregation software can be used to automate the extraction of data from any number of enterprise and/or site data sources and/or data bases and migrate the data to the MDL. The digital data sources can be any number of existing or future data sources and/or data bases including, but not limited to, wireless sensors, process historians, laboratory information systems, alarm management systems, vibrational analytics systems, business information systems, SQL database systems, and/or other non-traditional data, such as acoustic data and/or image/video data.

In some aspects, the data aggregation software for forming the MDL can provide system management capabilities. An example of a system management activity can be automatic detection of new data elements in the source data or database system. Automatic detection can be combined with manual or automated authorization to include the new data elements in all pending and future data extractions/transfers. This capability can allow the MDL to accurately reflect the various data elements in source systems that are desired for aggregation in a centralized data store.

Another example of system management activity can be automatic recovery of extraction/communication procedures interrupted by system hardware, software, or communication system issues or outages. This can be implemented in any convenient manner, such as by using separate messages for confirmation of writing and committing of data, to allow for verification at other processors and/or data stores regarding the current state of data in the MDL. An example is the recovery of process historian time series data to the MDL due to an outage in the communication link. Optionally, transfer of data into and/or out of the MDL can be performed using vendor API and/or standard communications protocols provided by for the data source and/or data base. One potential benefit of using existing vendor and/or standard communication protocols can be to allow programmatic interaction between the MDL extraction routine and one or more data systems containing the desired source data.

In some aspects, an MDL can be used as a scalable centralized data storage for structured and/or unstructured data of disparate digital data types including, but not limited, to simple numeric, matrix numeric, alphanumeric/text, image, video, and/or acoustic. Conventional methods can be used to allow the MDL to be robust with regard to maintaining data integrity during issues with system hardware, software, and communications. The MDL can be implemented in a public cloud, private cloud, and/or using on-premises hardware. Hadoop® and Microsoft Azure are examples of data storage systems/cloud processing environments providing this capability.

In some aspects, data mapping software can be used to automate, at least in part, the mapping of process historian tags (and other data sources) to any number of platform data organization schemes. These organization schemes may include internally developed and/or acquired vendor templates that can be used to describe at least a portion of the data associated with a piece of manufacturing equipment and/or manufacturing site assets (collections of equipment), such as up to all of such data. Examples of vendor templates can include, but not limited to, design, initial construction and revamp history, vendor equipment specifications, maintenance history, operational history, and/or operational performance indexes. An example of a vendor template system is OSIsoft's Asset Framework.

In some aspects, data screening and cleansing analytics methods and software can be used to identify and correct issues with data being migrated to and/or stored in the centralized data store. The methods can include algorithms and/or mathematical methods to condition, correct, and/or reconcile the raw data including, but not limited to, detecting suspect data, correcting suspect data, estimating missing data, and reconciling one or more data elements to constitutive mathematical relationships. An example is reconciling flow measurements around an asset or collection of assets to enforce material balance constraints, and storing these reconciled measurements as new data into the MDL. Other examples can include using larger sensor networks to condition data. For example, rather than just using data around an individual process unit for data conditioning (such as mass balancing), data related to performance of upstream and/or downstream processes can be used for data conditioning.

In some aspects, data access in the MDL can be provided via a role-based security model. Roles can be defined governing the extent of data access and system privileges at a site and/or enterprise level. Staff can be assigned role(s) commensurate with their access needs. Staff transitions can then be managed by re-assigning roles as necessary.

Other benefits can be related to the ability of an enterprise analytics platform to perform data analytics on the data retained in the MDL. This can provide a step-change increase in the pace of development and deployment of advanced analytics and machine learning applications to support all aspects of manufacturing site operations.

In some aspects, data analytics and machine learning methods libraries can be used to provide an efficient analytics application development and deployment environment. Preferably, the analytics codes can be easily ported to other software environments. This can be facilitated by use of common development languages. More generally, user-created analytics and/or vendor solutions can preferably be interoperable and supported across a number of software environments.

In some aspects, the integration of the enterprise analytics platform with the MDL can allow for use of predictive reliability software. Predictive reliability software can correspond to software, for example, to detect early signs of asset performance degradation and failure modes; to facilitate and support troubleshooting; and to assist in the determination of appropriate corrective actions. Examples of vendor software for this purpose include AspenTech Mtell, GE Asset Performance Management, and Schneider Electric PRISM.

In some aspects, natural language processing software can be used. Such natural language processing software can be beneficial for analyzing raw text data, such as operator logs, maintenance logs, work orders, and other types of documents that may be formatted with purposes in mind different from data aggregation. Additionally or alternatively, natural language processing can be used to automate the building of an "evergreen" site and enterprise taxonomy. Additionally or alternatively, natural language processing can be used to parse raw text into meaningful, consistent and searchable information.

Still other benefits can be related to improved performance computer processing capabilities (i.e., distributed or parallel processing capabilities) that are enabled by integrating the enterprise analytics platform with the MDL. The methods described herein, including pre-calculation of secondary aggregated data values for sequence-dependent data, can allow distributed processing environments to operate at higher efficiency in response to user requests for data analysis. This can enable complex computations associated with, but not limited to, large scale data queries, fundamental process models, optimization models, and data analytics methods and applications to be performed in time frames commensurate with business requirements.

Yet other benefits of the integrated environment can be related to automated notifications. After using data analytics methods and applications to perform data analysis on aggregated data, the resulting analysis can be used in manual and/or automated work processes to notify appropriate staff and organizations of emerging issues, and drive the resolution work process. In some aspects, this can include using software to enable site and enterprise wide role-based security access to facilitate sustainment of the configuration for automated notifications of pre-defined classes of issues. Additionally or alternatively, this can include using automated notification software keyed to the role-based security model including notification verification and/or designation of backup contacts. Additionally or alternatively, this can include using event resolution software to track/document the actions, analysis, and comments associated with the resolution of the identified issue into meaningful, consistent and searchable information.

Still other benefits can be related to a collaborative environment that is enabled by integration of the enterprise analytics platform with the MDL. By aggregating data into a central location, the systems and methods described herein can facilitate real-time communications and/or technical interactions between site staff members and members of the technical support organizations. For example, real-time analysis and visualization tools can be used to allow multiple users located at different physical locations (potentially worldwide) to simultaneously query, visualize, and analyze data in a collaborative, interactive manner. As another example, communications systems and software can be used to facilitate sharing of voice, image, video, data and other information types between multiple users located at different physical locations (potentially worldwide) in a simultaneous and interactive manner. As still another example, session documentation software can be used to self-document the flow and content of collaborative discussions into meaningful, consistent and searchable information. In this latter example, someone who did not attend a meeting session can subsequently reconstruct and understand the discussion (scribed into text format), the data analysis, the data visualization, and/or the other collaborative activities associated with the meeting session.

The centralized data store embodied in the MDL system can facilitate data organization and normalization as well further data processing. Organization of data can be facilitated by allowing use of historic time series data to assist with the mapping of process tags to equipment and/or asset templates. For example, time series data can be used along with natural language text analysis to semi-automate the process of mapping process historian tags and descriptions to equipment and/or asset templates.

Normalization of data can be performed during and/or after merging data sources from disparate data systems into the centralized data store. Data sources can including time series process data, time stamped lab data, RTO model solutions, operator logs, maintenance logs, alert and alarm data, and/or operating envelopes. The data can be analyzed to condition, correct, or reconcile the raw data from the source systems. Centralization of the data can enable application of algorithms to improve the consistency and quality of data from a given site by screening the data for outliers and/or reconciling raw data to known mathematical rules, such as verifying that material balances are satisfied.

After aggregating, organizing, and/or normalizing data, the data can be made accessible to users for implementation of solutions including, but not limited to, combinations of numerical modeling, statistical analysis, advanced data science methods, and supervised or unsupervised machine learning methods. Additionally or alternatively, application of algorithms on data from similar equipment and/or assets from different sites can be performed to identify outliers and patterns in the data across classes of equipment/assets. Enterprise-wide monitoring of equipment/asset operations, performance, and reliability can also be performed. Additionally or alternatively, the processing capabilities embodied in the MDL system can further facilitate implementation of the solutions by enabling complex computations to be performed in time frames commensurate with business requirements.

General Computing Environment

Figure 2:
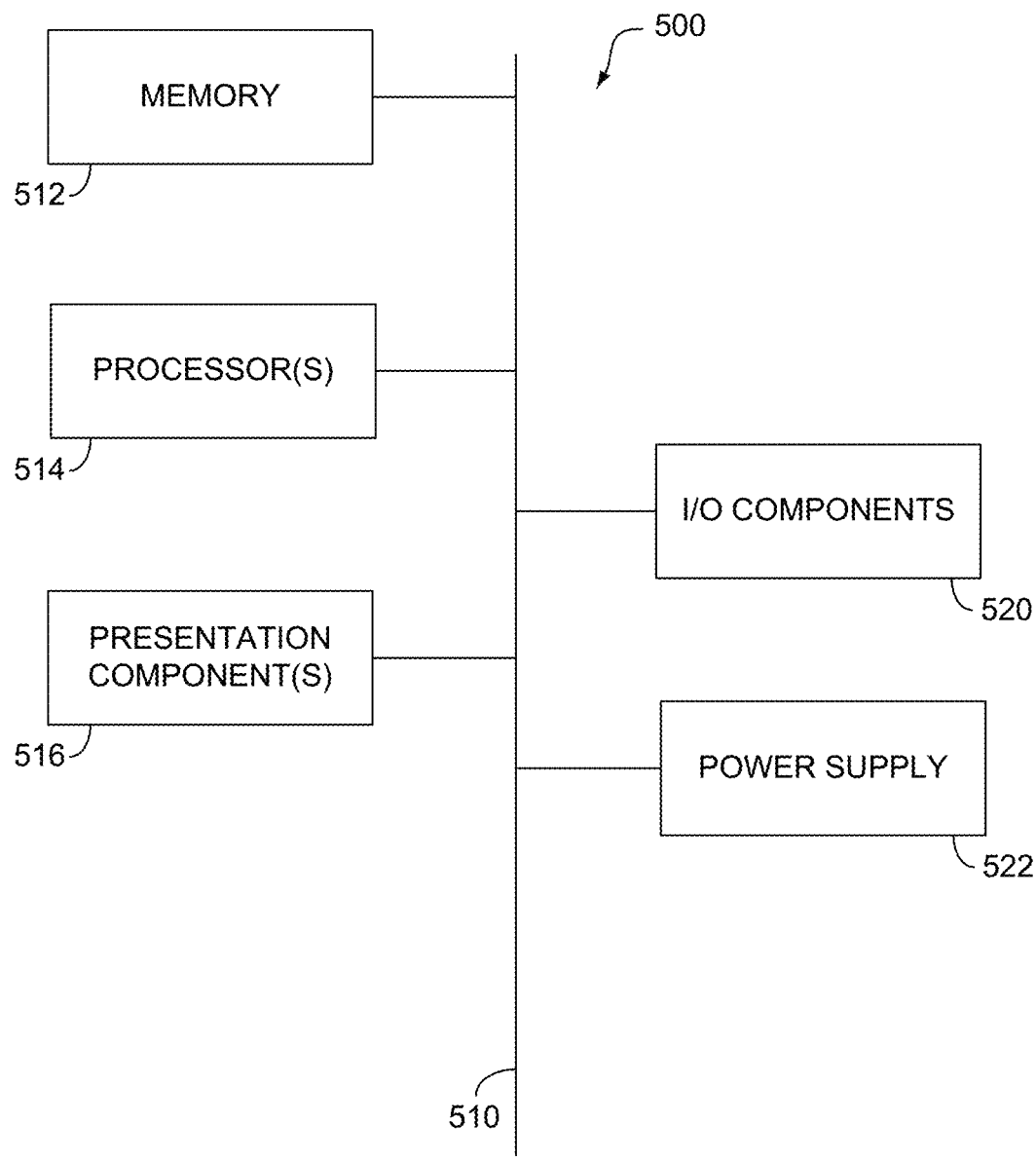
FIG. 2 shows an example of an exemplary computing environment.

Referring to the drawings in general, and initially to FIG. 2 in particular, an exemplary operating environment for implementing aspects of the technology described herein is shown and designated generally as computing device 500. Computing device 500 is but one example of a suitable computing environment and is not intended to suggest any limitation as to the scope of use of the technology described herein. Neither should the computing device 500 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 2, computing device 500 includes a bus 510 that directly or indirectly couples the following devices: memory 512, one or more processors 514, one or more presentation components 516, I/O components 520, and an illustrative power supply 522. Bus 510 represents what may be one or more busses (such as an address bus, data bus, or a combination thereof). Although the various blocks of FIG. 2 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 2 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 2 and refer to "computer" or "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. In some aspects, computer storage media corresponds to tangible computer storage media. In some aspects, computer storage media corresponds to non-transitory computer storage media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or nonvolatile memory. The memory 512 may be removable, non-removable, or a combination thereof. Exemplary memory includes solid-state memory, hard drives, optical-disc drives, etc. Computing device 500 includes one or more processors 514 that read data from various entities such as bus 510, memory 512, or I/O components 520. Presentation component(s) 516 present data indications to a user or other device. Exemplary presentation components 516 include a display device, speaker, printing component, vibrating component, etc.

Additional Embodiments

Embodiment 1. A method for managing sequence-dependent data sets in a distributed computing environment, comprising: obtaining process characterization data from a plurality of manufacturing site data sources comprising sequence-dependent data, the plurality of manufacturing site data sources being located at a plurality of production sites; storing the obtained process characterization data in data partitions; calculating one or more secondary aggregated data values based on sequence-dependent data from a plurality of data partitions, the plurality of data partitions including a first data partition and a second data partition; storing the calculated one or more secondary aggregated data values in the plurality of data partitions; receiving a data analysis request based on the obtained process characterization data; and processing the received request in a distributed computing environment to generate an analyzed result, the processing comprising processing data from the first data partition of the plurality of data partitions on a different node than data from the second data partition, the analyzed result comprising at least one secondary aggregated data value, at least one value based on a secondary aggregated data value, or a combination thereof.

Embodiment 2. The method of Embodiment 1, wherein the sequence-dependent data comprises time-sequence data.

Embodiment 3. The method of any of the above embodiments, wherein the plurality of manufacturing site data sources comprise a plurality of sensors, a plurality of process controllers, or a combination thereof.

Embodiment 4. The method of any of the above embodiments, wherein the plurality of production sites comprise a plurality of refineries, a plurality of chemical production sites, a plurality of extraction sites, or a combination thereof.

Embodiment 5. The method of any of the above embodiments, wherein the calculated one or more secondary aggregated data values are stored in the plurality of data partitions, or wherein the calculated one or more secondary aggregated data values are stored in a separate database from the plurality of data partitions, or a combination thereof.

Embodiment 6. The method of any of the above embodiments, wherein each of the calculated one or more secondary aggregated data values is stored in each of the plurality of data partitions.

Embodiment 7. The method of any of the above embodiments, wherein the calculated one or more secondary aggregated data values comprise time offset correlation values, the plurality of data partitions comprising data partitions for a plurality of sensors associated with different production processes in a production environment.

Embodiment 8. The method of any of the above embodiments, wherein the calculated one or more secondary aggregated data values comprise moving average values, the first data partition comprising data from a first time period for first data source and the second data partition comprising data from a second time period for the first data source.

Embodiment 9. The method of any of the above embodiments, wherein the calculated one or more secondary aggregated data values comprise interpolated data values, extrapolated data values, imputed data values, smoothed data values, or a combination thereof.

Embodiment 10. The method of any of the above embodiments, wherein the first time period and the second time period comprise consecutive time periods.

Embodiment 11. The method of any of the above embodiments, wherein the received data processing request comprises further data processing of at least one secondary aggregated data value to generate a tertiary aggregated data value, the analyzed result comprising the tertiary aggregated data value.

Embodiment 12. A system for managing sequence-dependent data sets in a distributed computing environment, comprising: a processor and associated memory containing computer-executable instructions that, when executed, provide a method according to the method of any of Embodiments 1 to 11.

Embodiment 13. A system for managing sequence-dependent data sets in a distributed computing environment, comprising: a manufacturing data lake comprising data partitions for storing received data from a plurality of manufacturing sites, the received data comprising sequence-dependent data; a pre-calculation component for pre-calculating secondary aggregated data values based on stored sequence-dependent data from a plurality of partitions of the manufacturing data lake; a database for storing the pre-calculated secondary aggregated data values; and one or more applications for processing the pre-calculated secondary aggregated data values to generate tertiary aggregated data values.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for managing sequence-dependent data and non-sequence-dependent data in a distributed computing environment, comprising:
   obtaining process characterization data from a plurality of manufacturing site data sources comprising sequence-dependent data and non-sequence-dependent data, the plurality of manufacturing site data sources being located at a plurality of manufacturing sites,
      wherein the plurality of manufacturing site data sources comprise a plurality of sensors, a plurality of process controllers, or a combination thereof,
      wherein the plurality of manufacturing site data sources are mapped to a plurality of configuration tags including at least one of a catalytic cracking configuration or a pipestill configuration;
   storing the obtained process characterization data in a plurality of data partitions;
   receiving a data analysis request based on the obtained process characterization data;
   pre-calculating one or more secondary aggregated data values based on the stored process characterization data based on the plurality of data partitions, wherein upon pre-calculating, the pre-calculated one or more secondary aggregated data values no longer have dependence upon the plurality of data partitions because the process characterization data is mapped to a general configuration such it can be mapped to similar but not identical processes that are associated generally with processes at the plurality of manufacturing sites;
   storing the pre-calculated one or more secondary aggregated data values,
      wherein the pre-calculated one or more secondary aggregated data values are stored in a data platform location comprising a central location, a cloud location, a local location, or a combination thereof, wherein the pre-calculated one or more secondary aggregated data values comprise time offset correlation values, the plurality of data partitions comprising data partitions for a plurality of sensors associated with different production processes in a production environment, the pre-calculated one or more secondary aggregated data values comprise moving average values, the first data partition comprising data from a first time period for first data source and the second data partition comprising data from a second time period for the first data source, and wherein the pre-calculated one or more secondary aggregated data values comprise at least smoothed data values;

processing the received request in the distributed computing environment to generate an analyzed result, the processing comprising processing data from the stored pre-calculated one or more secondary aggregated data value and data analysis of a user to generate a tertiary aggregated data value, the tertiary aggregated data value having no dependence upon the plurality of data partitions, and the analyzed result comprising the tertiary aggregated data value;

wherein the user has access to request the analyzed result based on a role-based security model;

presenting the analyzed result to the user on one or more of a display device, a speaker, a printing component, or a vibrating component;

by the user, analyzing the analyzed result using predictive reliability software; and by the user, implementing a solution selected from the group consisting of numerical modeling, statistical analysis, an advanced data science method, a supervised machine learning method, an unsupervised machine learning method, and any combination thereof based on the analyzed result.

2. The method of claim 1, wherein the plurality of data partitions including a first data partition and a second data partition, and wherein the moving average values, the first data partition comprising data from a first time period for first data source and the second data partition comprising data from a second time period for the first data source.

3. The method of claim 2, wherein the first time period and the second time period comprise consecutive time periods.

4. The method of claim 1, wherein the pre-calculated one or more secondary aggregated data values further comprise interpolated data values, extrapolated data values, imputed data values, or a combination thereof.

5. The method of claim 1, further comprising re-assigning the access to request the analyzed result based on the role-based model to a second user.

6. A system for managing sequence-dependent data and non-sequence-dependent data in a distributed computing environment, comprising:

a manufacturing data lake comprising a plurality of data partitions distributed to one or more processors for storing received process characterization data from a plurality of manufacturing sites, the received process characterization data comprising sequence-dependent data and non-sequence- dependent data, wherein the plurality of manufacturing site data sources comprise a plurality of sensors, a plurality of process controllers, or a combination thereof, wherein the plurality of manufacturing site data sources are mapped to a plurality of configuration tags including at least one of a catalytic cracking configuration or a pipestill configuration;

a pre-calculation component for pre-calculating one or more secondary aggregated data values based on the stored process characterization data based on the plurality of data partitions of the manufacturing data lake, wherein upon pre-calculating, the pre-calculated one or more secondary aggregated data values no longer have dependence upon the plurality of data partitions because the process characterization data is mapped to a general configuration such it can be mapped to similar but not identical processes that are associated generally with processes at the plurality of manufacturing sites;

wherein, once calculated, the pre-calculated one or more secondary aggregated data values no longer have dependence upon the plurality of data partitions, wherein the pre-calculated one or more secondary aggregated data values are stored in a data platform location comprising a central location, a cloud location, a local location, or a combination thereof, wherein the pre-calculated one or more secondary aggregated data values comprise time offset correlation values, the plurality of data partitions comprising data partitions for a plurality of sensors associated with different production processes in a production environment, the pre-calculated one or more secondary aggregated data values comprise moving average values, the first data partition comprising data from a first time period for first data source and the second data partition comprising data from a second time period for the first data source, and wherein the pre-calculated one or more secondary aggregated data values comprise at least smoothed data values;

a database for storing the pre-calculated one or more secondary aggregated data values, one or more applications for generating a user requested analyzed result, wherein the analyzed result is generated by the one or more applications by processing the pre-calculated one or more secondary aggregated data values and data analysis of the user to generate tertiary aggregated data values, the tertiary aggregated data values having no dependence upon the plurality of data partitions, and the analyzed result comprising the tertiary aggregated data, wherein the user has access to the one or more applications for processing the analyzed result based on a role-based security model;

a presentation component for presenting the analyzed result to the user on a display device, a speaker, a printing component, or a vibrating component; and predictive reliability software for determining one or more appropriate corrective actions; and an implementation component for implementing a solution selected from the group consisting of numerical modeling, statistical analysis, an advanced data science method, a supervised machine learning method, an unsupervised machine learning method, and any combination thereof based on the analyzed result to be taken by the user.

7. A system for managing sequence-dependent data and non-sequence-dependent data in a distributed computing environment, comprising:

a processor and associated memory containing computer-executable instructions that, when executed, provide a method comprising:

obtaining process characterization data from a plurality of manufacturing site data sources comprising sequence-dependent data and non- sequence-dependent data, the plurality of manufacturing site data sources being located at a plurality of manufacturing sites, wherein the plurality of manufacturing site data sources comprise a plurality of sensors, a plurality of process controllers, or a combination thereof, wherein the plurality of manufacturing site data sources are mapped to a plurality of configuration tags including at least one of a catalytic cracking configuration or a pipestill configuration;

storing the obtained process characterization data in a plurality of data partitions;

pre-calculating one or more secondary aggregated data values based on the stored process characterization data based on the plurality of data partitions, wherein upon pre-calculating, the pre-calculated one or more secondary aggregated data values no longer have dependence upon the plurality of data partitions because the process characterization data is mapped to a general configuration such it can be mapped to similar but not identical processes that are associated generally with processes at the plurality of manufacturing sites;

wherein the pre-calculated one or more secondary aggregated data values are stored in a data platform location comprising a central location, a cloud location, a local location, or a combination thereof, wherein the pre-calculated one or more secondary aggregated data wherein the pre-calculated one or more secondary aggregated data values comprise time offset correlation values, the plurality of data partitions comprising data partitions for a plurality of sensors associated with different production processes in a production environment, the pre-calculated one or more secondary aggregated data values comprise moving average values, the first data partition comprising data from a first time period for first data source and the second data partition comprising data from a second time period for the first data source, and wherein the pre-calculated one or more secondary aggregated data values comprise at least smoothed data values;

receiving a data analysis request from a user based on the obtained process characterization data;

processing the received request in the distributed computing environment to generate an analyzed result, the analyzed result comprising at least one value of the pre-calculated one or more secondary aggregated data values, at least one value based on the pre-calculated one or more secondary aggregated data values, or a combination thereof;

presenting the analyzed result to the user on one or more of a display device, a speaker, a printing component, or a vibrating component;

by the user, analyzing the analyzed result using predictive reliability software; and by the user, implementing a solution selected from the group consisting of numerical modeling, statistical analysis, an advanced data science method, a supervised machine learning method, an unsupervised machine learning method, and any combination thereof based on the analyzed result.

8. The system of claim 7, wherein the sequence-dependent data comprises time-sequence data.

9. The system of claim 7, wherein the plurality of data partitions including a first data partition and a second data partition, and wherein the moving average values, the first data partition comprising data from a first time period for first data source and the second data partition comprising data from a second time period for the first data source.

10. The system of claim 9, wherein the first time period and the second time period comprise consecutive time periods.

11. The system of claim 7, wherein the pre-calculated one or more secondary aggregated data values comprise interpolated data values, extrapolated data values, imputed data values, or a combination thereof.

12. The system of claim 7, wherein the received data processing request comprises further data processing of at least one pre-calculated secondary aggregated data value to generate a tertiary aggregated data value, the analyzed result comprising the tertiary aggregated data value.

* * * * *